(12) United States Patent
Boyles

(10) Patent No.: US 9,010,559 B2
(45) Date of Patent: *Apr. 21, 2015

(54) COLLAPSIBLE HARD CASE FOR SURFBOARDS AND OTHER LARGE OBJECTS

(71) Applicant: David A. Boyles, El Segundo, CA (US)

(72) Inventor: David A. Boyles, El Segundo, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/195,501

(22) Filed: Mar. 3, 2014

(65) Prior Publication Data

US 2014/0175092 A1    Jun. 26, 2014

Related U.S. Application Data

(63) Continuation-in-part of application No. 13/748,356, filed on Jan. 23, 2013, now Pat. No. 8,668,104, which is a continuation of application No. 13/224,904, filed on Sep. 2, 2011, now Pat. No. 8,381,930, which is a continuation-in-part of application No. 12/462,216, filed on Jul. 31, 2009, now Pat. No. 8,066,138.

(60) Provisional application No. 61/137,560, filed on Jul. 31, 2008.

(51) Int. Cl.
| | | |
|---|---|---|
| B65D 6/00 | (2006.01) |
| A45C 11/00 | (2006.01) |
| A01K 97/08 | (2006.01) |
| A63C 11/02 | (2006.01) |
| B63B 35/79 | (2006.01) |
| F41C 33/06 | (2006.01) |
| G10G 7/00 | (2006.01) |
| A45C 7/00 | (2006.01) |
| A63B 71/00 | (2006.01) |
| A63B 55/00 | (2006.01) |

(52) U.S. Cl.
CPC ............... *A45C 11/00* (2013.01); *A01K 97/08* (2013.01); *A63C 11/026* (2013.01); *B63B 35/7946* (2013.01); *F41C 33/06* (2013.01); *G10G 7/005* (2013.01); *A45C 7/0031* (2013.01); *A63B 71/0036* (2013.01); *A63B 2210/50* (2013.01); *A45C 7/0036* (2013.01); *A63B 55/00* (2013.01)

(58) Field of Classification Search
CPC ......... A63B 55/00; A63B 55/02; B65D 13/00
USPC .............................. 220/8; 190/110; 206/522
See application file for complete search history.

(56) References Cited

U.S. PATENT DOCUMENTS

| | | | | |
|---|---|---|---|---|
| 3,628,655 | A * | 12/1971 | Bohannon | 206/178 |
| 4,643,302 | A * | 2/1987 | Baumgardner | 206/315.1 |
| 6,966,439 | B2 * | 11/2005 | Weleczki | 206/315.3 |
| 8,066,138 | B2 * | 11/2011 | Boyles | 220/8 |
| 2004/0232016 | A1 * | 11/2004 | Dietrich | 206/315.3 |

* cited by examiner

*Primary Examiner* — Anthony Stashick
*Assistant Examiner* — Raven Collins
(74) *Attorney, Agent, or Firm* — Triangle Patents, PLLC

(57) ABSTRACT

A collapsible protective case for surfboards, musical instruments, or other large objects, including a housing having a rigid, impact-resistant outer surface, the housing being formed from a multiplicity of adjoining subsections that are selectively configurable between expanded and intermediate transport positions and a collapsed storage position.

19 Claims, 7 Drawing Sheets

COLLAPSIBLE HARD CASE FOR SURFBOARDS AND OTHER LARGE OBJECTS

CROSS-REFERENCE TO RELATED APPLICATIONS

This application is a continuation-in-part of application Ser. No. 13/748,356, filed Jan. 23, 2013, which is a continuation of application Ser. No. 13/224,904, filed Sep. 2, 2011, which is a continuation-in-part of application Ser. No. 12/462,216, filed Jul. 31, 2009, which claims the benefit of U.S. Provisional Application No. 61/137,560, filed Jul. 31, 2008, each of which is in incorporated herein by reference in their entirety.

BACKGROUND OF THE INVENTION

1. Field of the Invention

The present invention relates generally to travel cases or containers, and more particularly to a collapsible hard case for protectively transporting a large object.

2. Description of the Prior Art

Protective travel cases are generally known. By way of example, U.S. Publication 2004/0232016 provides a telescoping hard case for carrying a golf bag and U.S. Pat. No. 3,628,655 discloses a sectional, convertible wig case.

In particular, regarding surfboards, typically surfers travel to remote destinations for participating in the sport, especially for competitions, vacations, etc. Additionally, boards are shipped from manufacturers to distributors, retailers and customers using an archaic, damage prone method of cardboard, bubble wrap and duct tape packaging. There are currently no convenient methods for shipping such boards. Problematically, shipment of surfboards or transport in air cargo damages the board surface and introduces structural stresses that the boards were not designed to be exposed to. In many cases, incidental damage to boards during travel and/or transportation can functionally ruin a surfboard. In a specific circumstance, applicant's surfboard was destroyed by a baggage handler in airline transport to Hawaii from the continental US. Since boards are expensive and surfers typically prefer to use their own board rather than generic boards, especially for more advanced surfers and professionals in competition, there has been a need to provide a protective shipping case or container for surfboards.

Typically, however, containers for shipment of large objects, such as the size of a surfboard, are large and bulky. Upon safe transport of the surfboard then, the container must be stored in a correspondingly large space. Surfboards often range in length from 6-10 feet, in width between about 2-3 feet, and in depth about 3 inches.

One commercially available surfboard case offered at the time of the present invention is by Santa Monica Hard Case in California, USA. While this product provides a protective case for surfboards, it is formed of a flexible plastic that leaves the boards vulnerable to damage during transport or shipment. Also, it has limited size options and features. Furthermore, this case does not collapse into itself.

Thus there remains a need for a protective case for surfboards that also provides for convenient storage when not in use and for ease of transport when carried.

SUMMARY OF THE INVENTION

A first aspect of the present invention is to provide a protective case for large objects that is constructed and configured to be used in a fully expanded position for completely protectively and removably containing the large object, and to be alternatively collapsed to a collapsed position when not in use.

A second aspect of the present invention is to provide a collapsible protective case for large objects including a housing having a rigid, impact-resistant outer surface, the housing being formed from a plurality of adjoining sections that are selectively configurable between expanded, intermediate and collapsed positions.

Another aspect of the present invention is to provide a collapsible protective case for large objects, the case including a housing having a rigid, impact-resistant outer surface and a lined interior, the housing being formed from a plurality of adjoining sections that are selectively configurable between expanded, intermediate and collapsed positions. Large objects to be housed by the present invention include surfboards, bicycles, drums, keyboards, storage/travel cases, rifles, other weapons, skis, fishing equipment and snowboards.

These and other aspects of the present invention will become apparent to those skilled in the art after a reading of the following description of the preferred embodiment when considered with the drawings, as they support the claimed invention.

DETAILED DESCRIPTION

Figure 1:
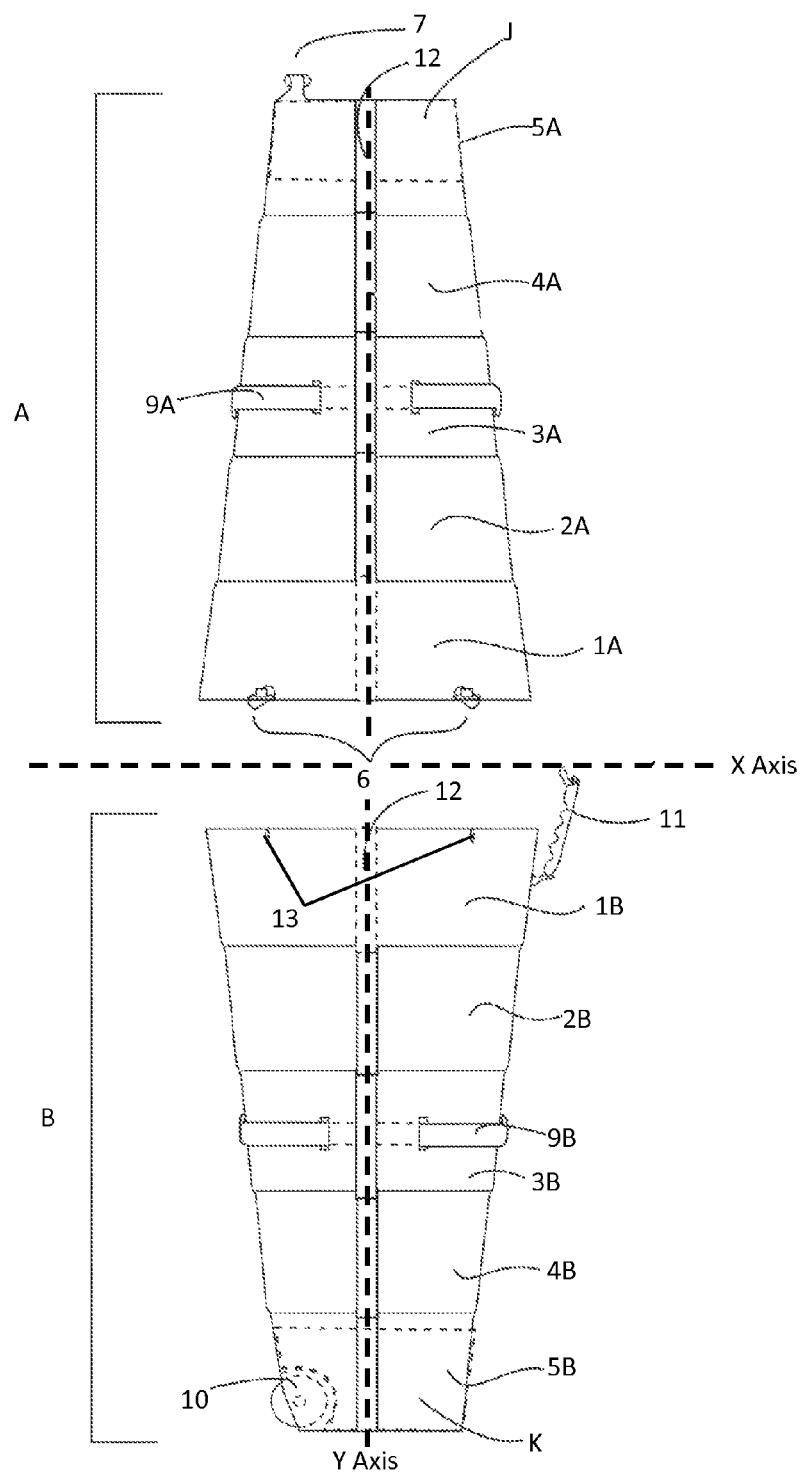
FIG. 1 illustrates a front view of a protective case in an extended position according to one embodiment of the present invention.

Referring now to the drawings in general, the illustrations are for the purpose of describing preferred embodiments of the invention and are not intended to limit the invention thereto.

The present invention provides a protective case for large objects constructed and configured to be used in expanded, intermediate and collapsed positions for completely protectively containing the object when housed, and to be alternatively configured in a collapsed position for storage of the case when not in use, i.e., when the object is not stored therewithin. More particularly, the present invention includes a collapsible protective case for large objects with a housing having a rigid, impact-resistant outer surface, the housing being formed from a multiplicity of adjoining sections that are selectively configurable between expanded, intermediate and collapsed positions.

Preferably, the rigid, impact-resistance outer surface is formed from a hard plastic or composite material that is sufficiently thick to prevent puncture or tearing and resist pressure, flexing or deformation, such that the object contained completely within the housing is protected from any external forces. Varying dimensions of the outer surface depend on the object or objects being stored, the transportation conditions, and the amount of protection desired. In one embodiment, the hard plastic shell is between 1/32 and 1/4 inches thick, preferably about 1/16 inches thick.

Figure 2:
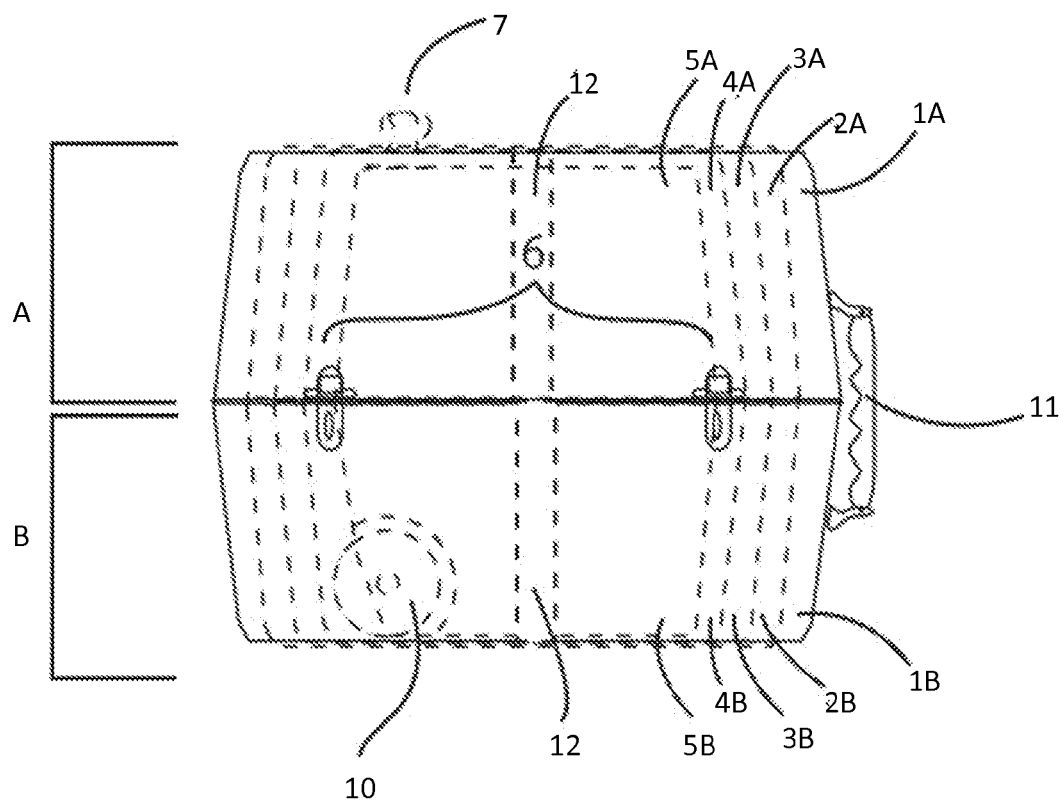
FIG. 2 illustrates an end view of the case shown in FIG. 1 in a collapsed position according to one embodiment of the present invention.
Figure 3:
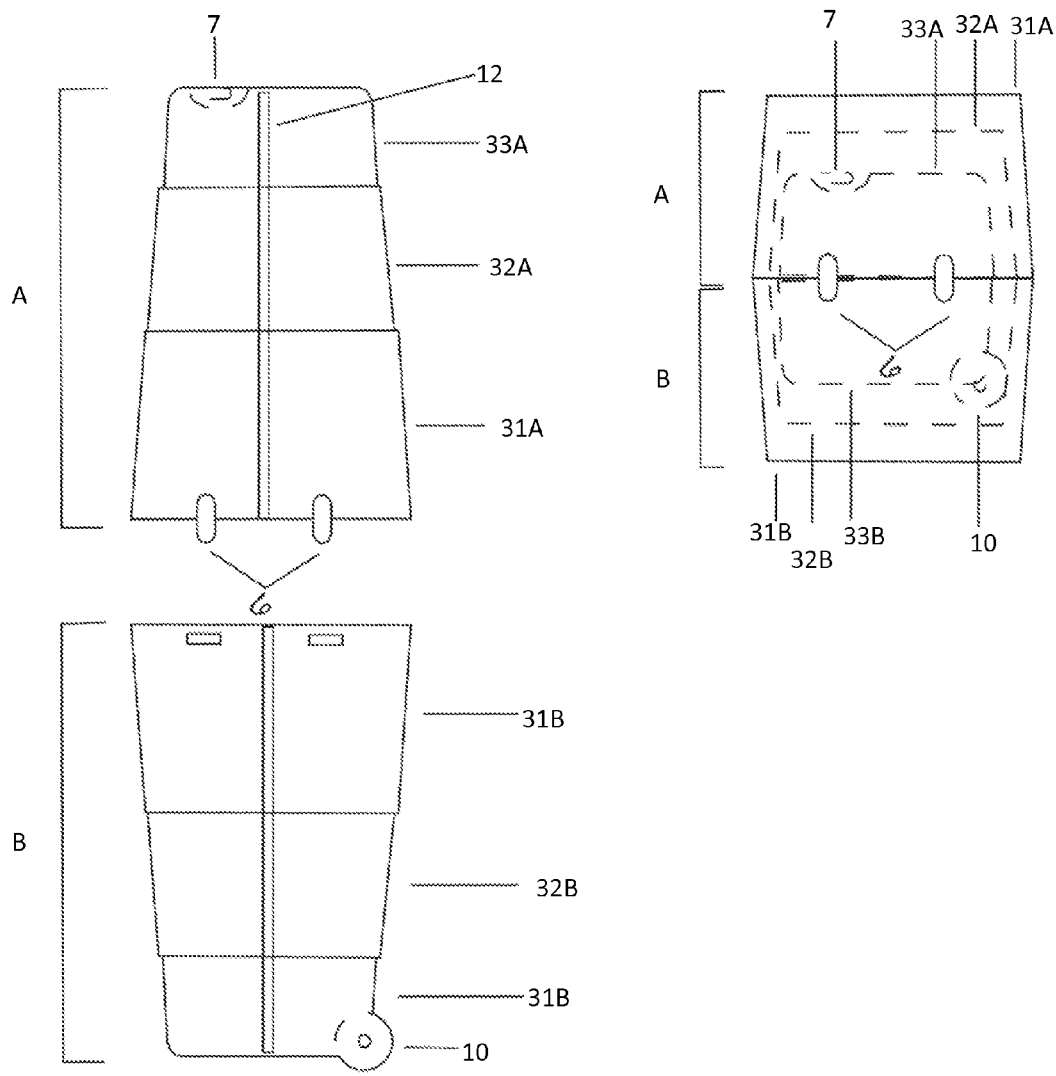
FIG. 3 illustrates side and end views of another embodiment of the present invention.

In one embodiment, illustrated by FIGS. 1-3, the housing is preferably formed from two mating sections A and B for completely encasing the object or objects from either end. Sections A and B are releasably connectable and lockable at the adjoining edges that form the middle of the housing. In one embodiment, the two separated sections A and B are approximately equal in size and dimensions. As shown in FIG. 1, with the exception of the wheels 10 and end handle 7, the housing is preferably symmetrical about the long axis Y and about the short axis X, in order to improve the balance of the housing in each position.

FIGS. 1 and 3 illustrate each of the two sections A and B being further comprised of subsections or cells (1A-5A, 1B-5B, 31A-33A and 31B-33B) that are constructed and configured to be juxtapositioned in the extended position. As illustrated in the Figures, innermost subsections 1A/B and 31A/B have larger dimensions that outermost end subsections 5A/B and 33A/B. When not being used for protectively encasing an object, these subsections collapse into each other substantially concentrically as illustrated in FIG. 2. In the collapsed position of FIG. 2, the housing of the present invention can conveniently be stored in a compact position, as illustrated by FIG. 3. In a preferred embodiment, each of the subsections is arranged so that the end-most subsections 5A/B and 33A/B collapse into the larger middle subsections 1A/B and 31A/B. Correspondingly, the intermediate subsections 2-4A/B and 32A/B collapse between end-most subsections 5A/B and 33A/B and middle subsections 1A/B and 31A/B as shown in FIGS. 2 and 3.

Referring to FIG. 1, sections A and B align longitudinally along the board length along track 12, which provides a notch and lock system providing a releasable securement of the subsections with respect to each other to form the rigid housing. Section A is releasably fastenable to the section B by a plurality of latches 6. In one embodiment, four latches are provided, as depicted in FIG. 1. Alternatively, two latches 6, one mirrored on each of two sides of the housing suffice. Alternatively, any number of latches 6 are positioned on subsection 1A or 31A with corresponding latch receptors 13 on subsection 1B or 31B. In any embodiment the latches 6 can be positioned on the exterior or interior of the housing or both, and optionally include a key or code locking mechanism.

In one embodiment, a carrying handle 11 is attached to a side of the case for easier carrying, but is strategically placed to function as a releasable attaching latch for connecting the sections A and B. Optionally and additionally, wheels 10 are positioned on one section and a roller handle 10 on the other section for easier transport of the case and object assembly. Also, optionally, a roof rack system 9 attached to one of the intermediate subsections 2A-4A and mirrored on one of the juxtaposed subsections 2B-4B is provided.

In one embodiment a lining 403 configured and positioned within the interior of the housing may be provided for additional protection and impact resistance for the large object(s). The lining may include an impact-absorbing or cushioning lining, such as foam, rubber or a coating, and may be affixed to the inner surface of at least one or all of the housing subsections or may be removably affixed to the one or more subsections. Optionally and alternatively, a protective flexible inner sleeve 404 may be used within the protective case; by way of example and not limitation, it may be independent of the housing and applied around the surfboard before the sleeve-wrapped board is inserted into the case. Preferably, the lining 403 and/or sleeve 404 dimensions are configured to provide flexibility in accommodating large object(s) of varying sizes and dimensions. Additionally, in an embodiment wherein both a lining 403 and sleeve 404 are provided, the sleeve may be at least substantially waterproof, thereby providing protection to the lining, which may be susceptible to mold or rot, or, alternatively the lining may be at least substantially resistance to wear and tear, thereby minimizing damage to the lining. Alternatively, the lining and/or sleeve itself may provide similar functionality, thereby minimizing similar damage to the housing.

In one embodiment, wherein a rubber sleeve 404 and foam lining or insert blocks J and K are provided, and wherein the large object is a surfboard, the surfboard would first be inserted into the sleeve and then the nose of the surfboard is slidingly placed into the block J at the end of subsection 5A while section A of the case is in a collapsed or intermediate position. Then the surfboard is pushed into the case, and the subsections 2A-5A are extended towards an expanded or intermediate position. Then the tail end of the surfboard is slidingly placed into the block K at the end of subsection 5B while section B of the case is in a collapsed or intermediate position. The subsections 2B-5B are then extended towards an expanded or intermediate position, thereby covering the remaining portion of the board not covered by section A. Sections A and B are attached by placing the latches 6 into a closed position (or releasably locked position). Optionally, the carrying handle is additionally closed or releasably locked using latch 11.

FIG. 3 illustrates side and end views of another embodiment according to the present invention; more specifically, it shows the collapsible case in both extended and collapsed positions from a side view (extended position) and end view (collapsed position). In this embodiment, two equal sections A and B are shown, these sections being further divided into subsections 1-3A/B. Subsection 3A/B collapses into subsection 2A/B and both subsections 2A/B and 3A/B collapse into subsection 1A/B. These subsections collapse along a track 12 to ensure the subsections collapse and extend with ease, while the track 12 also provides rigidity. Latches 6 secure sections A and B to each other. A wheel mechanism 10 is used to roll the case and handle 7 is used for pulling or carrying the case. In embodiments of the present invention, some of the sections or subsections are removable or insertable, allowing the case to be lengthened and shortened, thereby providing maximum size flexibility.

Figure 4:
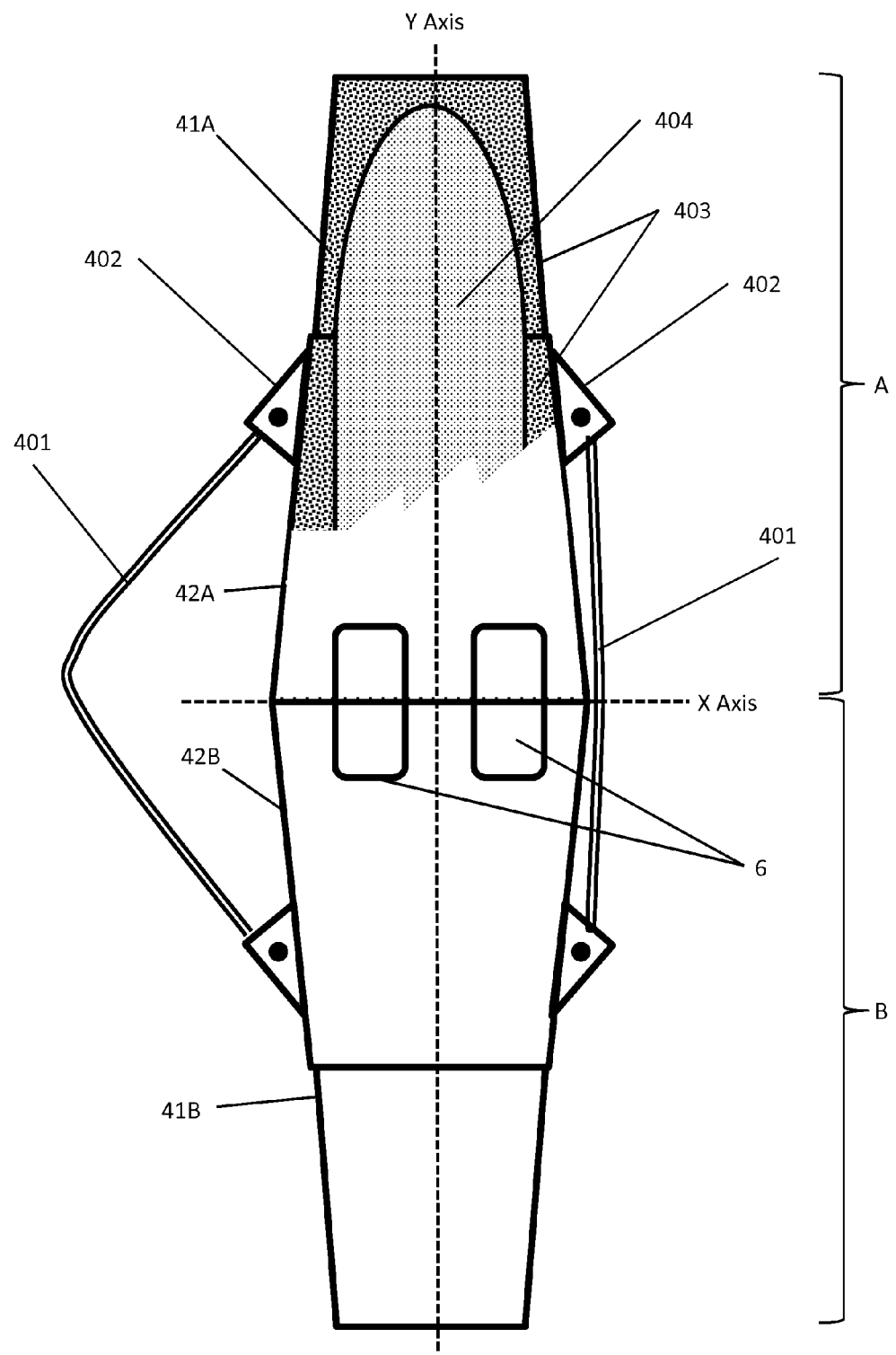
FIG. 4 illustrates a front view of a protective case in an extended position according to one embodiment of the present invention.
Figure 6:
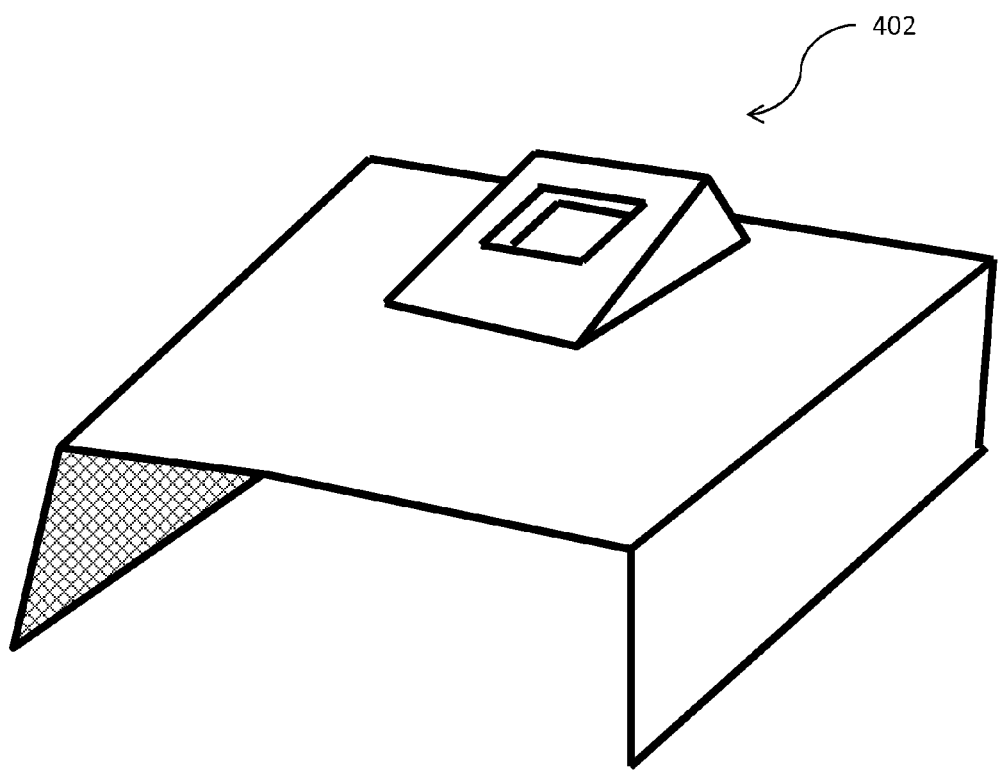
FIG. 6 illustrates a subsection having a boss according to one embodiment of the invention.

FIG. 4 illustrates another embodiment of the present invention, wherein at least one strap 401 is attached to bosses 402 located on the exterior of the housing sections A and B. Each strap is attached to the case with a securement mechanism, the securement mechanism preferably being a strap attachment boss 402, as depicted in FIG. 4. The strap attachment boss may be a separate piece connected to the case or integral to the outer housing manufacture. For example, and not by limitation, the boss 402 may be an integral feature of an injection molded section 401-402A/B, as depicted in FIG. 6. Further, the strap and boss design is capable of being mirrored or duplicated on one or more other sides or sections. One embodiment of mirrored bosses is depicted in FIG. 4. Furthermore, the strap is comprised of any suitable material or fabric, such that the weight of the case and enclosed object(s) are capable of being lifted from a resting position without risk of tear or breakage. In a preferred embodiment, four bosses 402 and two straps 401 are included in the case design, as depicted in FIG. 4.

In one embodiment, a strap is positioned and secured between two bosses, the two bosses equally positioned from the apex 406 of the case. In such an embodiment, the strap is adjustable in length through the boss, such that the slack of the strap may be configured to the particular user and situation. In one embodiment, a hook-and-loop-type fastener is provided as a means of releasably attaching one end of a strap to a portion of the strap body for securing the strap in a fixed position. In another embodiment, a first boss may house a retractable cord mechanism and the other boss, being mirrored in a position across the apex on the same housing side, may house a releasable attachment mechanism. By way of example and not a limitation, the retractable cord mechanism may be similar to the mechanisms described in U.S. Pat. No. 8,096,740 by inventors Parker, et al., U.S. Pat. No. 6,053,381 by inventors Fahl, et al. or U.S. Publication 2011/126778 by inventor Lucy Mitchell, each of which is incorporated by reference herein in its entirety, such that the excess strap remains housed within the boss and is lockable in a multiplicity of lengths. Also, by way of example and not a limitation, the releasable attachment mechanism may be a selectably releasable clasp.

In one embodiment, the strap can be adjusted to give greater slack, so that the user-transporter can place the strap over the shoulder. Alternatively, the strap can be tightened to remove any excess slack, allowing the user-transporter to carry the case by placing the strap within the grip of a hand instead of over the shoulder. As one skilled in the art would appreciate, the strap is adjustable to any length in any of the expanded, intermediate or collapsed positions, such that the case may be carried over the shoulder, with the hand, or attachable to another system, such as to a rack or over a hook. Also, according to embodiments of the present invention, wherein the case is in an intermediate or collapsed position, the strap can be configured to act as a restraining strap around the case, thereby preventing the case from accidentally expanding.

In another embodiment, wherein the case is attachable to an automobile luggage rack, the method of attaching the case to the rack includes steps of: disengaging one side of the strap from one boss, placing the case on the rack with the disengaged strap side of the housing facing down, looping the strap from the remaining attached boss around the rack, reengaging the strap to the disengaged boss, and firmly tightening the strap.

Figure 5:
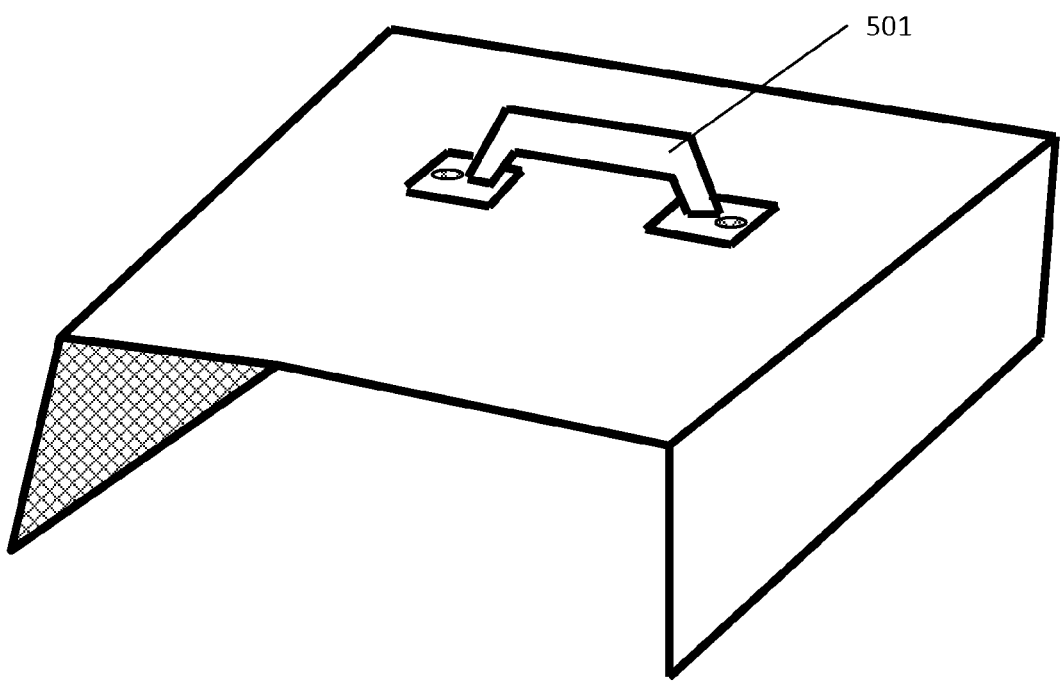
FIG. 5 illustrates a subsection having a handle according to one embodiment of the invention.

FIG. 5 illustrates another embodiment of the present invention, wherein a handle 501 is affixed to at least one section of the case to aid in transportation. Preferably the handle is centered on the case, section and/or subsection. Optionally, the handle is riveted to the case, as depicted in FIG. 5. The handle 501 is comprised of a metal, a metal encased in rubber, or any other suitable material.

Notably, the strap attachment boss 402 serves at least two purposes: (1) a securement mechanism for the strap, and (2) an anti-rocking mechanism for the case when in a resting position. As depicted in FIG. 4, the collapsible and adjoining sections create a substantially diamond-shaped silhouette when the case is viewed from the side. Because the center of the case has the greatest height at the apex, when the case is in a resting position it may have a tendency to tilt to one end or the other. A pair of strap attachment bosses 402, individually depicted in FIG. 6, when positioned on the bottom of the case, prevents the case from tilting or rocking in either direction. This advantageous feature provides stability and reduces the risk of injury or damage.

In the case of use for a surfboard, each section is about half the length of a surfboard but slightly larger to properly and protectively secure the surfboard therein when combined together. In the case of use for an asymmetrical object or objects, such as golf clubs, musical instrument, etc., the sections and subsections may remain symmetrical and either (1) inserts are provided and/or (2) the housing is configured in one of the intermediate positions to compensate for the asymmetry of the object(s) and provide protection to the object(s). In the embodiment wherein inserts are provided, at least one insert is placed in a subsection of section A or B or both. By conforming the interior of the housing to provide an improved fit to the large object or objects, whether through the use of inserts or intermediate positions or both, the large object(s) are less likely to move within the housing during transport, thereby minimizing damage or disorganization of the object(s).

Figure 7:
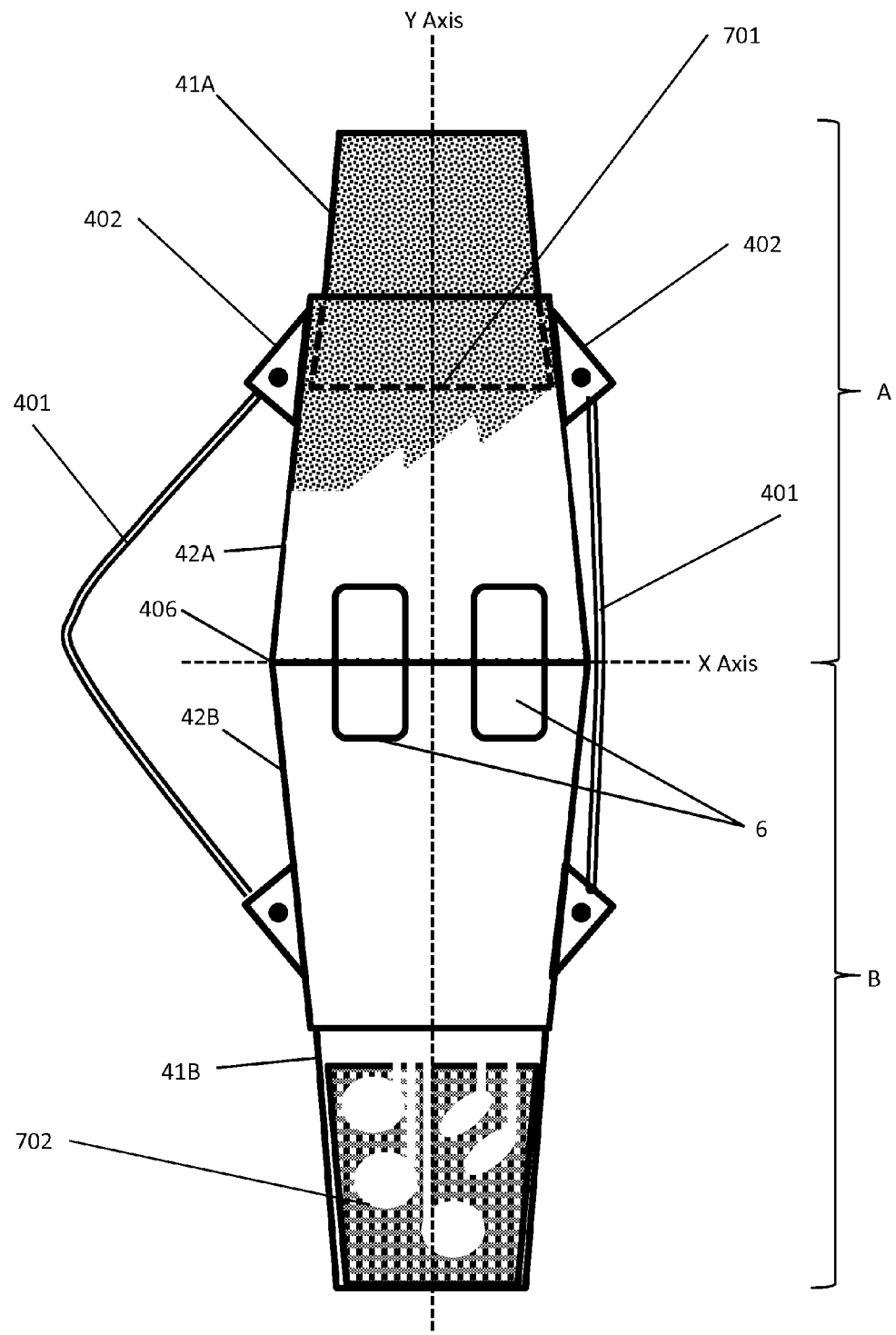
FIG. 7 illustrates a front view of a protective case in an intermediate position and having an insert according to one embodiment of the invention.

FIG. 7 illustrates an embodiment having an insert and configuring a subsection into an intermediate position to provide a better fit for the object(s), in this case golf clubs. Subsection 41A is configured into intermediate position 701 so as to remove any excess volume from the interior of the housing when the golf clubs are housed therewithin. Additionally, golf club insert 702 is placed within subsection 41B to provide a tighter fit within this subsection, thereby minimizing the movement of the clubs during transport. As one skilled in the art would appreciate, any number of designs and configurations could be included as an insert in order to contain portions of a housed large object(s).

In a another embodiment, the case includes a housing having a rigid, impact-resistant outer surface, the housing being formed from two equal halves, each half having a multiplicity of adjoining sections that are selectively configurable between an expanded transport position and a collapsed storage position; the housing being symmetrical about the long axis and about the short axis. Furthermore, in another embodiment, the housing halves have equal number of adjoining sections and the housing halves are symmetrical when in an expanded or collapsed position.

Certain modifications and improvements will occur to those skilled in the art upon a reading of the foregoing description. The above mentioned examples are provided to serve the purpose of clarifying the aspects of the invention and it will be apparent to one skilled in the art that they do not serve to limit the scope of the invention. All modifications and improvements have been deleted herein for the sake of conciseness and readability but are properly within the scope of the present invention.

The invention claimed is:

1. A protective case for large objects, comprising:
   a housing including a rigid, impact-resistant outer surface, the housing being formed from a first section and a second section, both of the sections including at least two adjoining subsections that are selectively configurable between expanded and collapsed positions;
   a strap positioned and affixed between two bosses, each of the bosses centrally positioned on the exterior of the innermost subsections of each of the sections;
   two additional bosses juxtaposed and mirrored in position to the first and second bosses on the opposite side of the subsections; and
   an additional strap positioned between the two additional bosses.

2. The case of claim 1, wherein the sections further include a track system that provides releasable locking engagement of the adjoining subsections.

3. The case of claim 1, wherein the subsections are removable.

4. The case of claim 1, further including additional insertable subsections.

5. The case of claim 1, further including at least one insert for placement within one of the subsections.

6. The case of claim 1, further including a lining permanently or removably affixed to the interior of the housing.

7. The case of claim 6, further including a flexible inner sleeve positioned within the lining.

8. The case of claim 1, further including a flexible inner sleeve positioned within the housing.

9. The case of claim 1, wherein the strap length is adjustable.

10. The case of claim 9, wherein one of the bosses is configured to house any excess of the strap length.

11. The case of claim 9, wherein the strap length is adjustable to enwrap the housing in the collapsed position, thereby preventing the housing from expanding.

12. The case of claim 1, wherein the strap includes at least two hook-and-loop releasably attachable strips for configuring the strap in at least two positions.

13. The case of claim 1, wherein the strap is permanently affixed to one of the bosses and removably affixed to the other boss.

14. The case of claim 1, further including a handle affixed and centrally positioned to one of the subsections.

15. The case of claim 1, further including a wheel on the outermost subsection of the first section and a handle on the outermost subsection of the second section.

16. The case of claim 1, further including at least two latches positioned across the edge of the innermost subsections of each of the sections for adjoining and locking the sections to each other.

17. A protective case for large objects, comprising: a housing including a rigid, impact-resistant outer surface, the housing being formed from a first section and a second section, both of the sections including at least two adjoining subsections that are selectively configurable between expanded, intermediate and collapsed positions; and a strap positioned and affixed between two bosses, each of the bosses centrally positioned on the exterior of the innermost subsections of each of the sections; and wherein the strap length is adjustable to enwrap the housing in the collapsed or intermediate position, thereby preventing the housing from expanding.

18. A protective case for large objects, comprising:

a housing including a rigid, impact-resistant outer surface, the housing being formed from a first section and a second section, both of the sections including at least two adjoining subsections that are selectively configurable between expanded and collapsed positions; and a strap positioned and affixed between a first boss and a second boss, the first boss and the second boss centrally positioned on the exterior of the innermost subsection of the first section and the second section, respectively; and wherein the strap length is adjustable and wherein one of the first and second bosses is configured to house any excess of the strap length.

19. The case of claim 18, wherein the strap length is adjustable to enwrap the housing in the collapsed position, thereby preventing the housing from expanding.

* * * * *